United States Patent
Krauss

(10) Patent No.: US 10,303,507 B2
(45) Date of Patent: May 28, 2019

(54) OFF-THE-SHELF SOFTWARE COMPONENT REUSE IN A CLOUD COMPUTING ENVIRONMENT

(71) Applicant: International Business Machines Corporation, Armonk, NY (US)

(72) Inventor: Kirk J. Krauss, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 236 days.

(21) Appl. No.: 15/469,748

(22) Filed: Mar. 27, 2017

(65) Prior Publication Data

US 2018/0276030 A1      Sep. 27, 2018

(51) Int. Cl.
*G06F 9/46* (2006.01)
*G06F 12/14* (2006.01)
*H04L 29/08* (2006.01)

(52) U.S. Cl.
CPC ............ *G06F 9/466* (2013.01); *G06F 12/145* (2013.01); *G06F 2212/1008* (2013.01); *G06F 2212/154* (2013.01); *H04L 67/10* (2013.01)

(58) Field of Classification Search
None
See application file for complete search history.

(56) References Cited

U.S. PATENT DOCUMENTS

| | | |
|---|---|---|
| 2008/0288624 A1 | 11/2008 | Armangil |
| 2015/0199212 A1 | 7/2015 | Acheff et al. |
| 2016/0239338 A1 | 8/2016 | Bohm et al. |

OTHER PUBLICATIONS

Mel, et al. "The NIST Definition of Cloud Computing". Recommendations of the National Insitute of Standards and Technology. Nov. 16, 2015.

*Primary Examiner* — Gregory A Kessler
(74) *Attorney, Agent, or Firm* — Kurt P. Goudy, Esq.; McGinn IP Law Group, PLLC

(57) ABSTRACT

A distributed data processing method, system, and computer program product include distribution of production software automatically without being designed for such distribution by the developers of the software and consideration of breakdown, automatic or otherwise, of a production software application into its components such that execution of the components can be distributed across nodes.

20 Claims, 6 Drawing Sheets

OFF-THE-SHELF SOFTWARE COMPONENT REUSE IN A CLOUD COMPUTING ENVIRONMENT

BACKGROUND

The present invention relates generally to a distributed data processing method for application software, and more particularly, but not by way of limitation, to a system, method, and computer program product for distributing processes for computation beyond the limits of their virtual address spaces by offloading their in-memory components across nodes.

Most cloud computing systems rely on hardware virtualization to emulate the behavior of one or another off-the-shelf platform, often on heterogeneous real hardware. A drawback of this virtual machine ("VM") based approach is the waste of resources entailed by replication of software components from VM to VM. When different applications running on different VMs share the resources of a cloud or other distributed computing environment, each of them requires its own services, device drivers, shared libraries, etc. It would be advantageous for all such components to be reusable and shared by all the applications that run in a cloud system.

Typically, the various components accessible by a distributed operating system reside within a cluster of nodes. However, the conventional techniques for distributed operating systems do not provide for off-the-shelf software to be distributed onto such a system, but rather limit any software designed without distributed computing in mind to execute only on a single computing node within the distributed computing environment. To date, distributed operating systems do not at all lend themselves to running ordinary software in a distributed manner because of drawbacks in the various techniques.

There is a need in the art for a system that allows off-the-shelf software, intended for execution on a conventional operating system, to be distributed across nodes without requiring a special rebuild or version. Further, there is a need for application software and/or services to be able to invoke components that run on various nodes, in order to achieve fairly balanced component deployment across nodes and to avoid duplicative component deployments from node to node, all without the application software or services necessarily being aware that they are running on a distributed system. If such a system were made available, software could then be tested bringing all the tools and techniques usable on conventional operating systems to bear. Ordinary software could then be distributed within a cloud computing environment in a more highly scalable manner than can be achieved via conventional hardware virtualization alone.

SUMMARY

In an exemplary embodiment, the present invention can provide a computer-implemented distributed data processing method for a software application that includes no code that targets a distributed data processing system, the method including in a first process executing a first software component on a first computer, establishing a reference to at least a second software component resident on a second computer, establishing a handler in a second process executing on the second computer, determining that the first process is attempting to invoke a routine of the second software component, transferring data from the first process to the second process, arranging for the first process to await a response from the second process, and invoking, by the second process, the routine of the second software component; and providing, by the second process, the response to the first process. One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
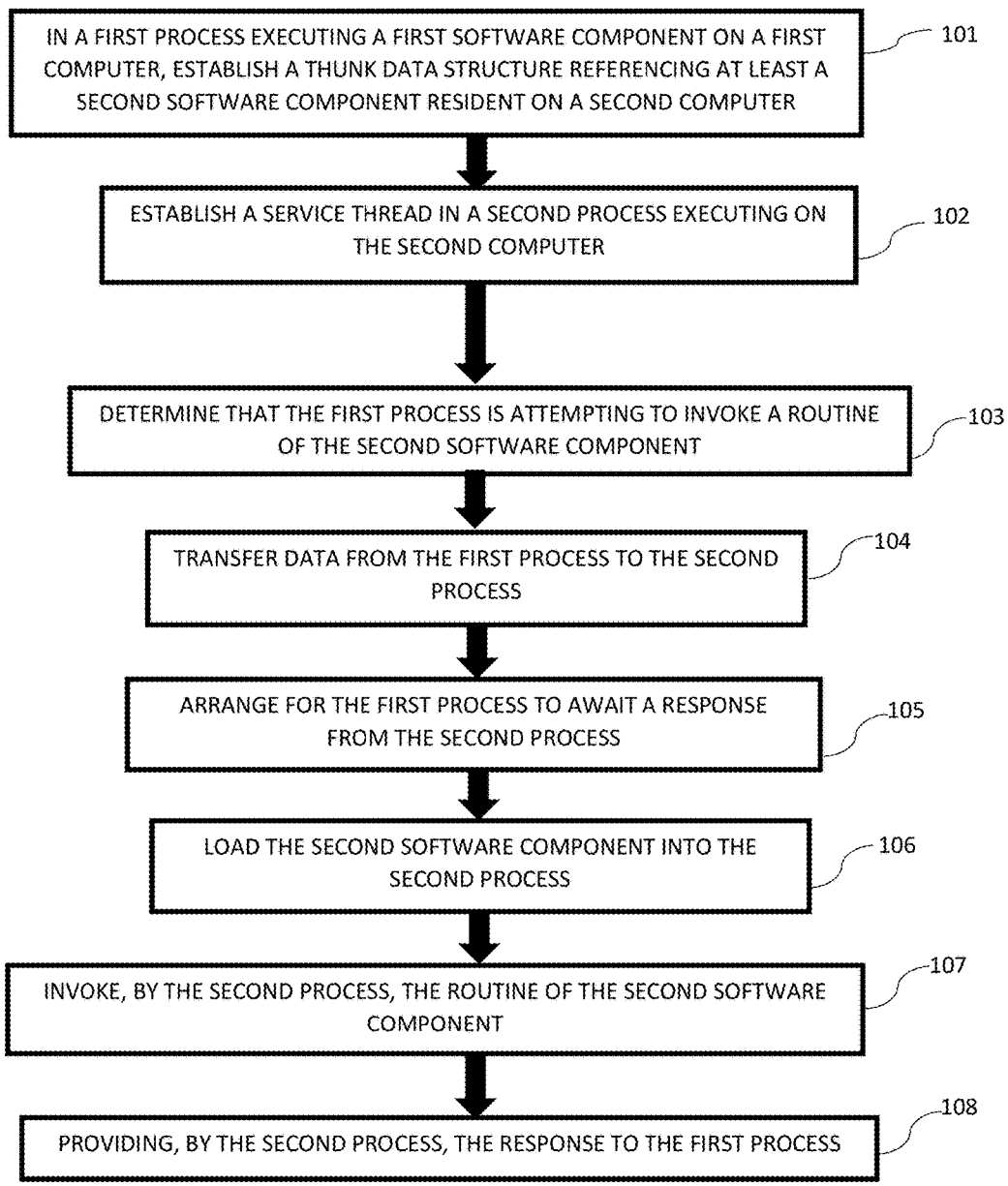
FIG. 1 exemplarily shows a high-level flow chart for a distributed data processing method 100 according to an embodiment of the present invention.

The invention will now be described with reference to FIGS. 1-6, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a distributed data processing method 100 according to the present invention can include various steps for allowing for a software application that has been designed with single-node operation in mind to operate in a distributed fashion by automatically arranging for components of the application to execute across multiple nodes.

Figure 4:
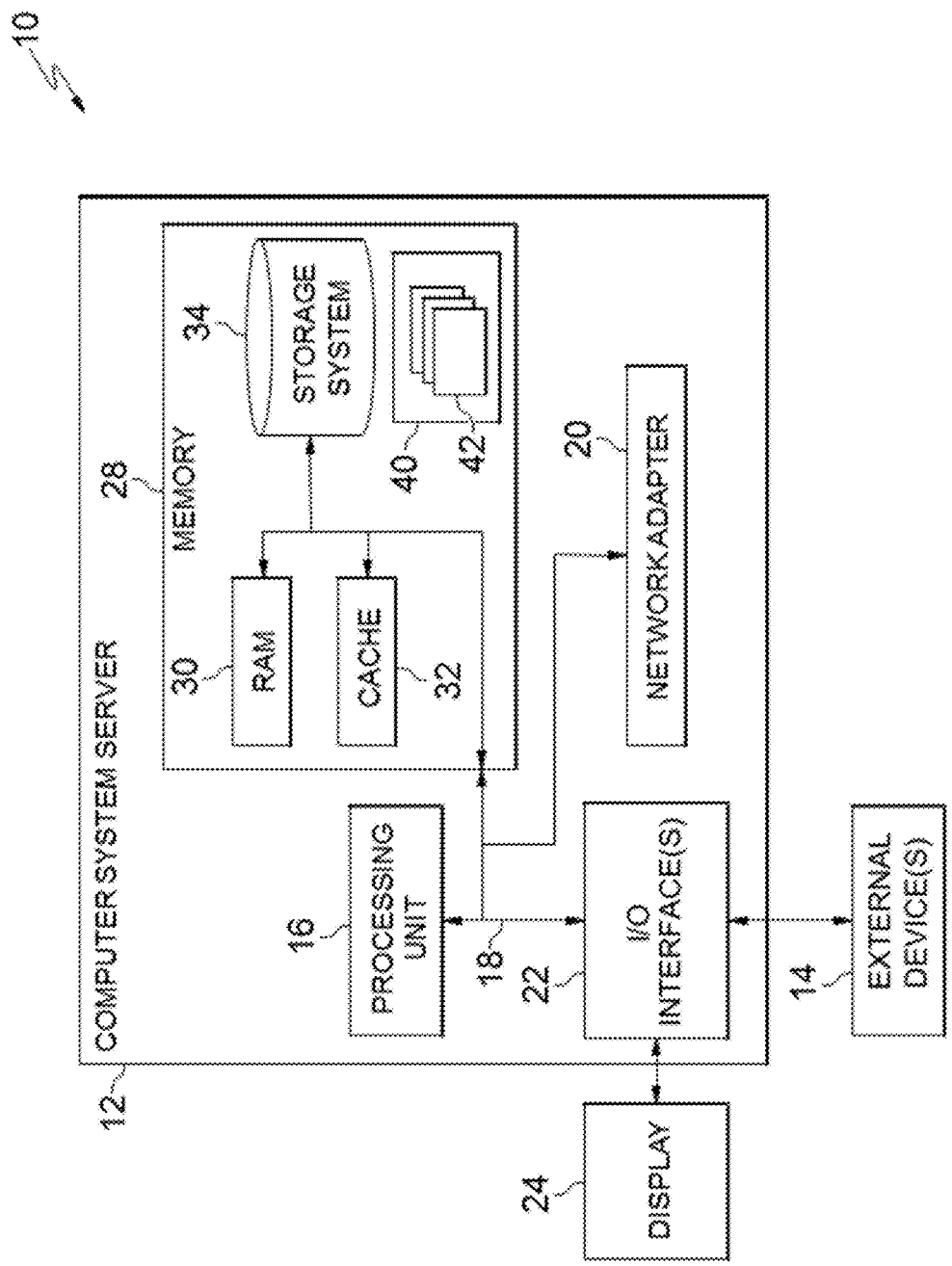
FIG. 4 depicts a cloud-computing node 10 according to an embodiment of the present invention.

By way of introduction of the example depicted in FIG. 4, one or more computers of a computer system 12 according to an embodiment of the present invention can include a memory 28 having instructions stored in a storage system to perform the steps of FIG. 1.

With reference generally to the embodiments of the invention, when a user or service is authenticated to the system, one of the nodes responds by providing a user interface or a service management interface. The user or service can launch a process. The process may launch on any node. The process may attempt to load software components, which may (unbeknownst to it) load on any other node. Calls to those components can be directed to the appropriate node via one or more thanks that reference a directory of components installed on a remote computer and/or one or more components resident or loaded on a remote computer.

A thunk comprises one or more routines, data structures, or objects used to provide an interface outside of the system's ordinary calling mechanism. An embodiment can use a thunk, either individually or in a collective known as a thunk layer, to redirect calls between components, such that a call intended for a component that might have been loaded into the address space of a process is redirected to a component running in a separate address space of a separate process running on a separate processor. In various embodiments, the thunk or thunk layer can be established via system call interception, hooks, or operating system intervention. System call interception can be arranged via code instrumentation, such as by instructions inserted into object code or byte code. Hooks can be arranged via platform-dependent code such as the SetWindowsHookEx( ) API function provided on the Microsoft Windows® platform. Operating system intervention can be arranged via various means that will be apparent to those who possess ordinary skill in the art, such as a loader modification that can identify a component that may reside on a separate node. The thunk or thunk layer can be established by one of these or other means in accordance with the inventive arrangements disclosed herein. Thus the invention can be embodied via application software, a service, a device driver, an operating system loader, or another operating system component or components suitable for carrying out the several purposes of the invention.

Virtual memory from the original process may be referenced by the nodes via a page fault that triggers the copying of pages from the process on demand. A page fault is an exception or interrupt that occurs when a process attempts to access virtual memory that is not mapped to physical memory. Conventional operating systems typically handle a page fault by loading a page from disk into memory. In embodiments, updates to the pages can be transferred back to the originating process, either in real time or at the time when control is returned to the calling routine in the originating process. The invention's only performance cost will be that of arranging the needed transparent inter-process communication and page-fault handling between nodes.

Software components, such as dynamically loadable modules, are set up to reside on suitable nodes, for example, nodes that handle other similar components or components related to a given software package or bundle, whenever software is installed. Some administrator insight may be needed to select a node on which a particular component, or set of components, will reside. Otherwise, once software is installed, further special user intervention is not required (e.g., to run and load applications and components). A directory of installed components and their corresponding nodes can be maintained automatically. Software runs, from a user or administrator perspective, in just the manner it normally would run. Other than software installer aspects that may prompt a user or administrator to choose nodes on which to install or load components that will be available to processes running on the distributed system, the inventive arrangements disclosed herein, including those of the following paragraphs, take place "beneath the covers".

It is noted that a "component" as referred to herein is a software component discretely operable on a distributed system and can include a virtual machine, a set of virtual machines, a hypervisor, an operating system, an operating system service or device driver, an executable program, a module or library loadable by or linked with an executable program, an object, a set of objects, a code sequence, a function, a method, a procedure, a thread, a fiber, a dynamic-link library ("DLL"), a shared object ("SO"), or any information, having an executable aspect, that may be discretely instantiated in a distributed context. In the examples provided herein, unless otherwise indicated, a component may be considered to be a module that may be dynamically loaded by an executable program operable on a distributed system. The examples provided herein are not intended to limit the scope of the invention.

A thunk or thunk layer is incorporated into each process. The thunk or thunk layer can reference the component directory or information derived from that directory. The thunk or thunk layer also can reference any remote components, or routines made available by remote components, needed by the process. In lieu of loading executable component code into the virtual memory for a process on a given node, a reference to the thunk is used to invoke a routine made available by that component via a synthesized remote procedure call ("sRPC"). Conventionally, a remote procedure call is arranged in a predetermined manner for participating components by a software developer, via compiler directives or via calls to API functions such as the RpcBindingCopy( ) function provided on the Microsoft Windows® platform. In various embodiments, the sRPC can be automatically arranged, as needed to intercept calls between components that execute on disparate nodes, via calls to applicable API functions from code invoked by or in tandem with the thunk or thunk layer described hereinabove. As such, the sRPC can be arranged by application software, a service, a device driver, an operating system loader, or another operating system component or components suitable for carrying out the several purposes of the invention.

In some embodiments a service thread, created on the node where the component resides, will handle the sRPC. In some embodiments, each service thread that handles sRPC processing can run in its own process whose virtual address space is a virtual duplicate, in whole or in part, of the address space of the caller process. When sRPCs are generated by multiple threads of a single caller process, then multiple service threads that handle the sRPCs can share the duplicate virtual address space corresponding to that caller process. In some embodiments, when multiple processes running on outboard nodes share a component, then multiple processes or service threads also can run on the node on which the component resides, each of which will handle the sRPC processing for a corresponding outboard process. In other embodiments, a single service thread will determine which outboard process and thread is associated with each local process and thread, and will route calls from various outboard processes accordingly. In keeping with the various embodiments described hereinabove, a service thread can be created by application software, a service, a device driver, an operating system loader, or another operating system component suitable for carrying out the several purposes of the invention.

Figure 2:
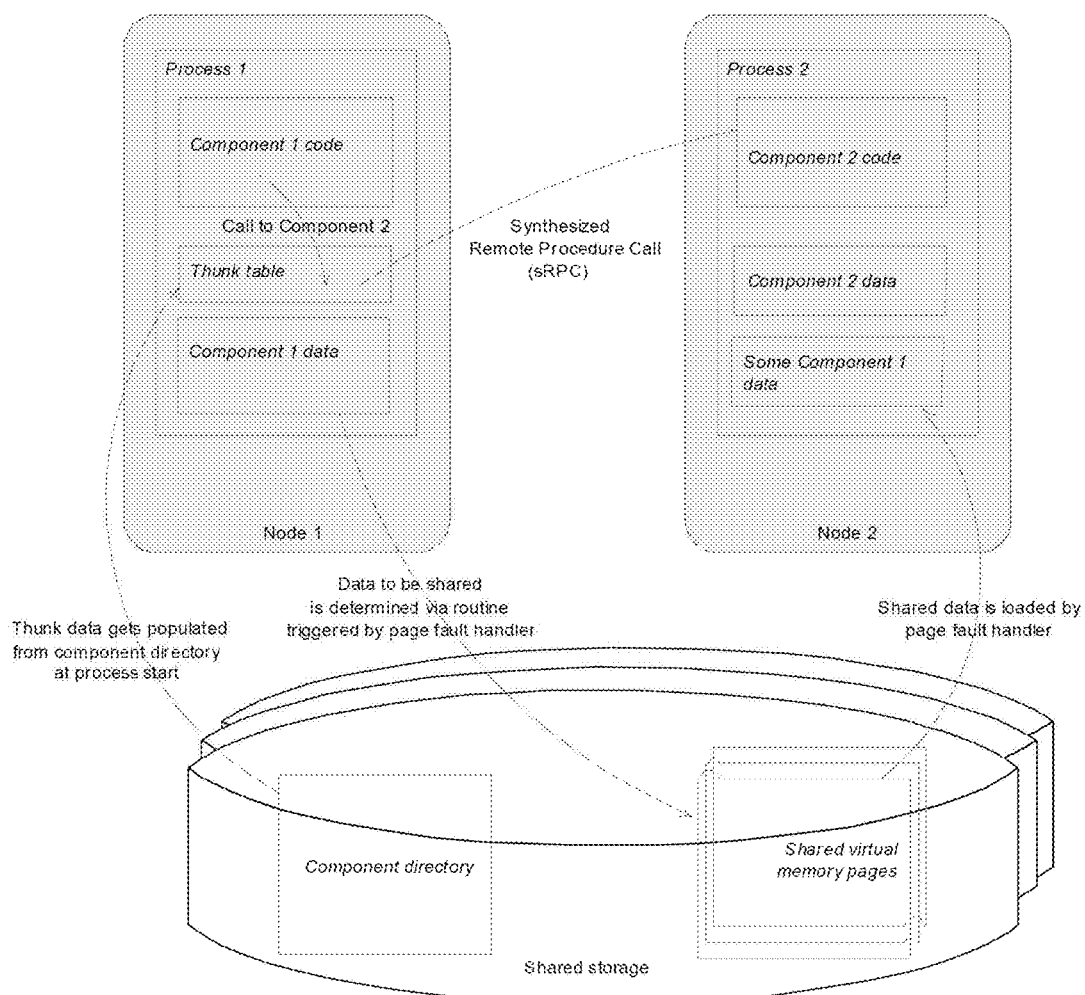
FIG. 2 exemplarily depicts how off-the-shelf components designed to load into a single process are distributed across nodes without necessarily requiring the overhead created by hardware virtualization.

With reference to FIG. 2, if an sRPC specifies a component that has not yet been loaded, then the corresponding service thread can load the component. In some embodiments, the component can be loaded into the virtual address space of the process in which that service thread is running. To enable this functionality, the service thread will execute code that determines that the component is resident on the node but unloaded. If an error occurs in the loading of the component, then the service thread can look to the directory of installed components to find any other nodes that may have backup copies of the component. If a backup copy is found, then another service thread, running on that node where the backup component is resident, can be invoked to handle the sRPC. In the event that the component cannot load, or if its routines cannot be invoked by any service thread on the distributed system, then the system will arrange for the raising of an exception back in the caller process on the originating node. That exception will be similar to any exception that would have been raised, had a component failed to load locally into the caller process, or to be invoked therefrom, on a conventional system. The thunk functionality described hereinabove can include the logic necessary for detecting failed sRPCs based on timeout expirations, error values returned from sRPC handlers, or other means, and raising the appropriate exceptions in the caller process.

When a service thread requires access to virtual memory belonging to the caller process that is not present on the node where the component resides, a page fault will result. Processing of the page fault will involve copying one or more pages from the caller process to the virtual address space available to the service thread on the node where the component resides. A mechanism such as distributed shared virtual memory can provide for copying those virtual memory pages.

Figure 3:
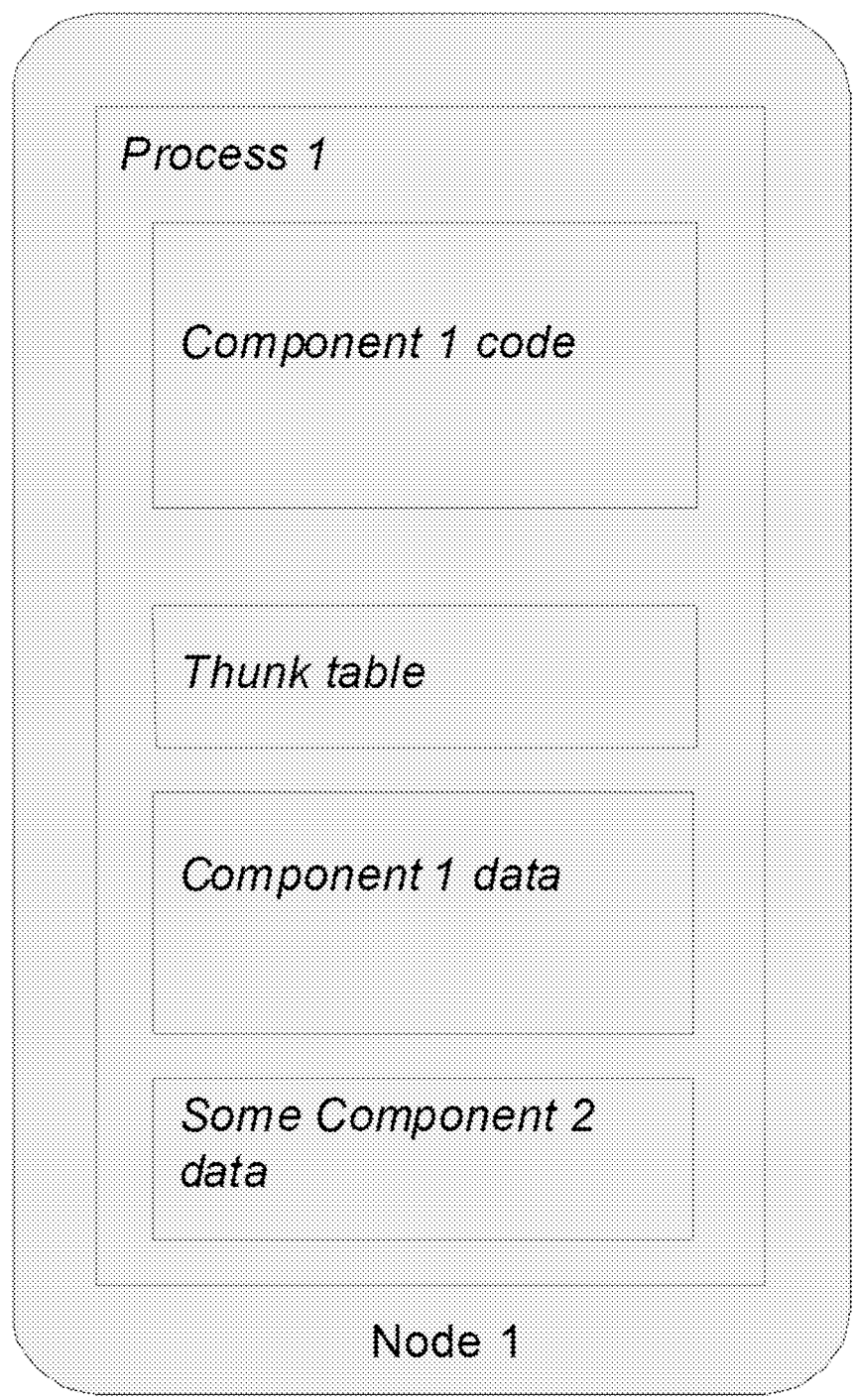
FIG. 3 exemplarily depicts a process overview for a first node.

When the service thread updates a virtual memory page that has been shared with the first component, the system can arrange for the corresponding page in the caller process on the originating node to be "dirty". Any attempt by the caller process to access that page can then result in another page fault. A handler for the page fault will copy any updates made by the service thread back to caller process on the originating node. With reference to FIG. 3, once control returns from an outboard component, accessing pages that have been allocated or committed on behalf of that component or updated by that component will trigger further page faults; the system will then pull the allocated, committed, or updated pages into the address space of the caller process. In some embodiments, detection and handling of accesses to dirty pages can be arranged by application software or a service or driver that tracks inter-process interactions that happen via the thunk or thunk layer described hereinabove. Embodiments that rely on application software to intercept memory reads and writes and thus discover and track dirty pages can do so by various means known in the art. One means available to application software or other high-level software for this purpose includes object code insertion, byte code insertion, or other instrumentation designed to intercept all memory accesses. Another means comprises not committing, or storing and then decommitting, memory pages. When a remote process attempts to access any decommitted page, the high-level software can handle an exception raised as a result of the attempt, by reloading the page either from the remote process or from disk, depending on whether the page is dirty or not, respectively. Dirty pages can be stored to disk when control is returned from a component to an outboard caller process, and the corresponding pages within the caller process can be decommitted by thunk code or by a routine shared throughout the thunk layer. Shared disk storage may serve for storing decommitted pages and for reloading them into a process on any node that attempts to access them. In other embodiments, detection and handling of accesses to dirty pages can be performed by one or more operating system components, such as versions of those operating system components that raise and handle conventional page faults on conventional systems, but extended to embody the page fault raising and handling aspects of the invention.

In some embodiments, the set of service threads that handle sRPC processing can belong to one or more thread pools. A thread pool can provide threads for sRPC processing on behalf of one or more components residing on a node, or for all of the components residing on a node. A thread that has completed sRPC handling for a caller process can await further sRPC requests from that process or can be returned to the thread pool, to be redeployed as needed for the handling of sRPC invocations from other callers. Threads that are no longer in use can be returned to the pool based on a least-frequently-used model. Likewise, pages from caller processes that are no longer referenced can be evicted from a node based on a least-frequently-used model.

The shared memory ranges and page fault handlers can be set up based on a storage system that is shared by all of the participating nodes. A system that is set up according to the invention can run multiple processes concurrently on multiple nodes, sharing the same set of components among all of the processes. For any given number of real computers, such a system will be scalable to run more processes, and can provide each process with more resources, than systems that rely entirely on conventional hardware virtualization arrangements to meet cloud computing needs.

With reference to FIG. 1, a computer-implemented distributed data processing method 100 for a software application that includes no code that targets a distributed data processing system is depicted.

In step 101, in a first process executing a first software component on a first computer, a reference is established to at least a second software component resident on a second computer; in some embodiments the reference can be a reference to a thunk object, data structure, or routine.

In step 102, a handler is established in a second process executing on the second computer; in some embodiments the handler can be an sRPC handler.

In step 103, it is determined that the first process is attempting to invoke a routine of the second software component.

In step 104, data is transferred from the first process to the second process; in some embodiments a thunk is used for data transfer; in some embodiments shared memory is used; in some embodiments an inter-process communication mechanism is used.

In step 105, arrangement is made for the first process to await a response from the second process; in some embodiments a caller thread of the first process can enter a wait state; in other embodiments the entire first process can wait; in yet other embodiments the first process can continue executing in expectation of an interrupt or other signal from the second process.

In step 106, by the second process, the routine of the second software component is invoked; in some embodiments invocation is arranged via a thunk.

In step 107, the second process provides the response to the first process.

The above embodiments of the invention can provide at least that installed software components are not duplicated across nodes, other than as may be necessary for redundancy/failover purposes. Another benefit of the invention is that in-memory components are not duplicated, either; the in-memory executable code for a component remains local to the node on which that component resides. Because a thunk or thunk layer serves in lieu of loading a component into the virtual memory of a caller process, the invention can enable a distributed computing model with no hardware virtualization, allowing that caller process to greatly conserve virtual memory and eliminating the overhead associated with hardware virtualization itself and any hypervisor, instruction set emulation, etc. Embodiments that are operable in non-virtualized cloud computing platforms can thus support more processes than equivalent hardware-virtualized platforms, by conserving hardware resources. Off-the-shelf software also can fit into the virtual address space that it expects to be available, while effectively loading more components than would normally fit into that virtual address space, without the need for developers to concern themselves with distributed computing concepts or with rewrites targeting specialized distributed computing or cloud computing platforms.

In other words, processes get to expand beyond the limits of their virtual address spaces by offloading their in-memory components across nodes. Without requiring virtual machines, for any given number of nodes, the overall system can run more and bigger processes, on a given set of nodes, than would be possible with a state of the art cloud computing environment that is based on conventional hardware virtualization. The invention also can be embodied in an environment involving virtual machines. Certain benefits of the invention, such as allowing for components to not be replicated among virtual machines, can be realized in such an environment. Further, the invention can be embodied in yet other environments and provide similar benefits.

Exemplary Aspects, Using an Embedded Computing Environment

Embedded systems are increasingly common in the Internet of Things ("IoT") landscape and increasingly communicate with one another. Although this detailed description includes an exemplary embodiment of the present invention in an embedded/IoT computing environment, it is to be understood that implementation of the teachings recited herein are not limited to such an embedded/IoT computing environment. Rather, embodiments of the present invention are capable of being implemented in conjunction with any other type of distributed computing environment now known or later developed.

Computing devices embedded in other devices or objects are typically relatively simple with respect to general purpose computers such as the cloud-computing node 10 depicted in FIG. 4. As such, embedded computing devices may not have the facilities necessary to support multi-threaded operation as described in other exemplary embodiments of the invention as disclosed herein. Nonetheless, the invention may be embodied in a set of embedded computing devices, notwithstanding the lack of multithreaded operation, so long as a set of embedded computing devices can otherwise act as a distributed computing environment as described herein, and so long as the off-the-shelf software to be distributed across the set of embedded computing devices comprises a set of components that each can independently reside on any of the embedded computing devices among the set of embedded computing devices.

Each embedded computing device, among a set of such devices that each act as members of a distributed computing environment, can provide a user interface or a service management interface. The user or service can interact with a process. The process may execute on any of the embedded computing devices in the set. The process may attempt to invoke routines provided by software components that may reside on any other embedded computing device in the set. Each call to a non-local component can be directed to the appropriate embedded computing device via a thunk that references a directory of installed components. A thunk also can reference any routines of the non-local component as needed by the process.

An embodiment of the invention that relies on virtual memory management provided by the embedded computing devices can arrange for virtual memory from the original process to be referenced by the embedded computing devices via a page fault that triggers the copying of pages from the process. Updates to the pages can be transferred back to the originating process, either in real time or at the time when control is returned to the calling routine in the originating process. The embedded computing device on which each software component resides can be automatically tracked via a directory of components. Software runs, from a user or administrator perspective, in just the manner it normally would run.

In other embodiments in which the embedded computing devices do not support virtual memory or paging on their own, a shared memory mechanism may serve to allow for components operable on the various embedded computing devices to transfer both control and memory updates among one another. Control can be transferred from a calling routine on an originating embedded computing device to a subroutine made available by a component, operable on a different device, that can provide updates to shared memory accessible by the originating device. The directory of components can automatically track not only the device on which each software component resides, but also the portion of shared memory usable by any pair of components among which control is transferred across devices. Software runs, from a user or administrator perspective, in the manner it normally would run, albeit with a portion of the address space of each process reserved for the shared memory purposes made necessary given the lack of virtual memory support for such an embodiment.

For either of the embedded computing embodiments described above, a thunk referencing the component directory or information derived from that directory is available to each embedded computing device. A reference to the thunk is used to invoke a routine made available by that component via a call, such as a remote procedure call, that can target an embedded computing device that is programmed to handle it. In some embodiments, the call can be as simple as an interrupt or other signal that is associated with a shared memory region recognizable by the embedded computing devices. When multiple embedded computing devices share a component, then all of the devices also will share the arrangement for handling the signal and associating it with the appropriate shared memory region, possibly with the assistance of information in the component directory.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Retelling now to FIG. 4, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 4, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 5:
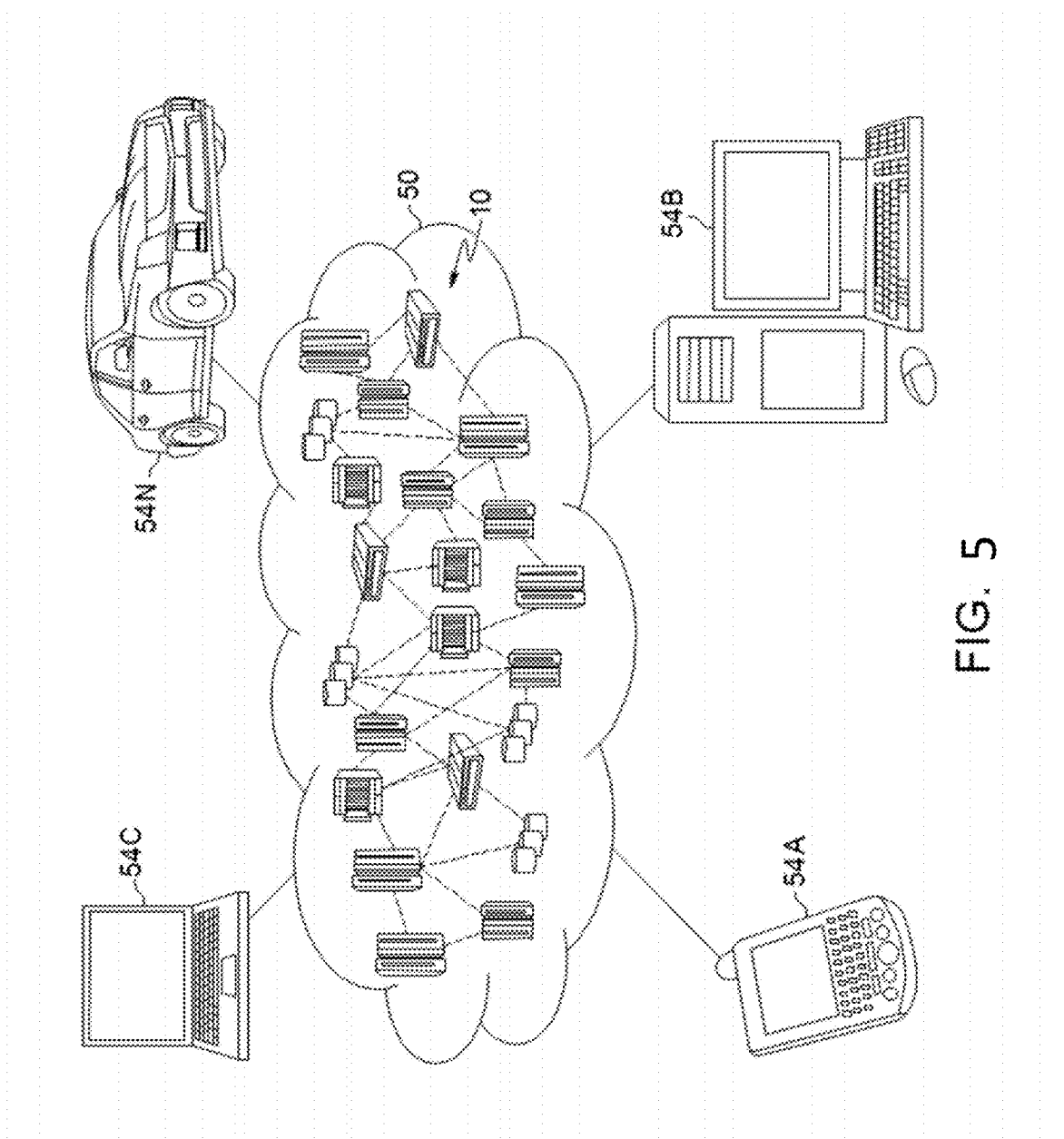
FIG. 5 depicts a cloud-computing environment 50 according to an embodiment of the present invention.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Figure 6:
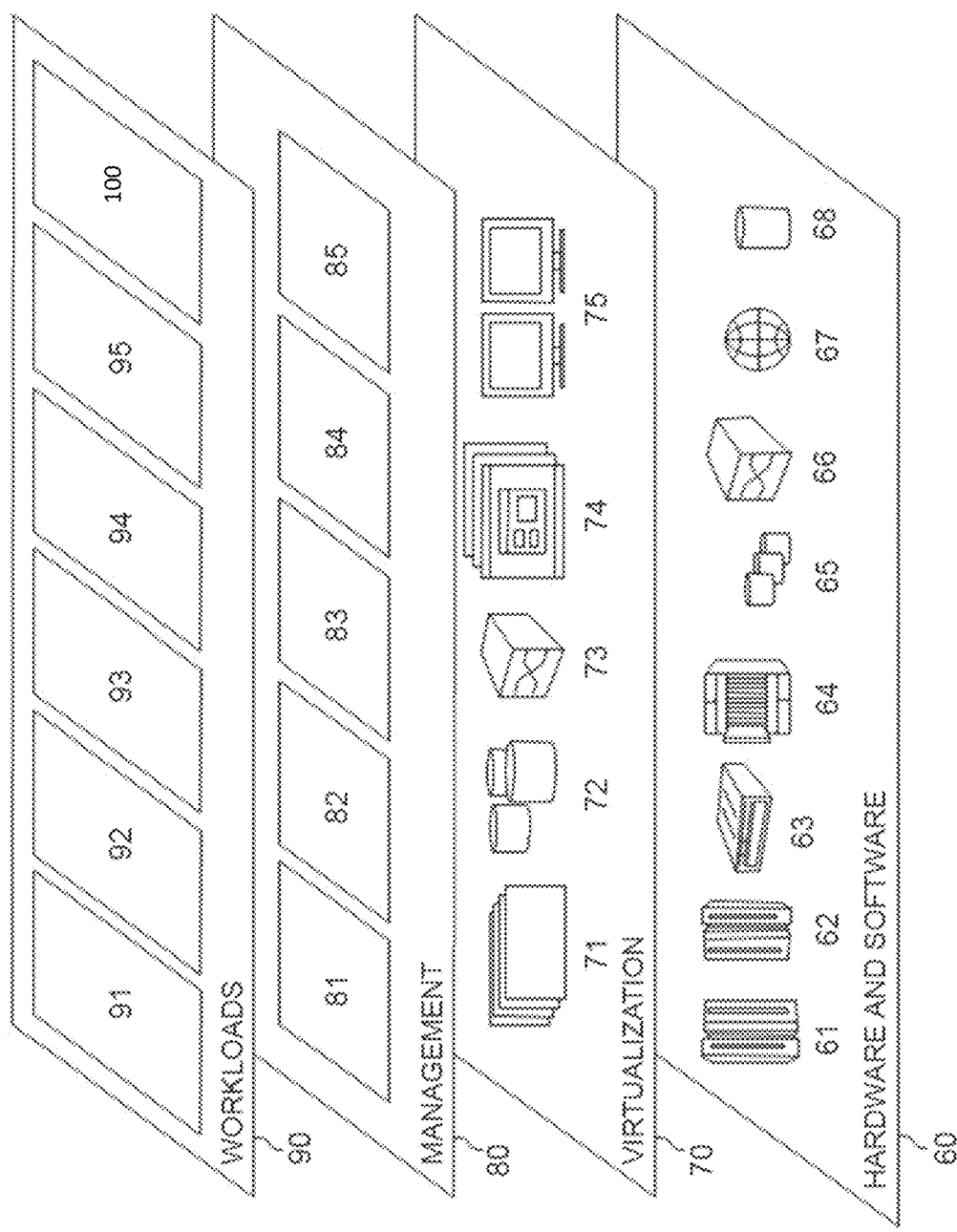
FIG. 6 depicts abstraction model layers according to an embodiment of the present invention.

Referring now to FIG. 6, an exemplary set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud. computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and distributed data processing method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented distributed data processing method for a software application that includes no code that targets a distributed data processing system, the method comprising:
    in a first process executing a first software component on a first computer, establishing a reference to at least a second software component resident on a second computer;
    establishing a handler in a second process executing on the second computer;
    determining that the first process is attempting to invoke a routine of the second software component based on the handler;
    transferring data from the first process to the second process;
    arranging for the first process to await a response from the second process;
    invoking, by the second process, the routine of the second software component; and
    providing, by the second process, the response to the first process.

2. The computer-implemented method of claim 1, wherein the transferring data from the first process to the second process comprises transferring parameters that are passed between the first software component and the second software component as part of a call to a routine.

3. The computer-implemented method of claim 1, wherein an attempt by the second software component to access certain data established by the first software component generates a page fault.

4. The computer-implemented method of claim 3, wherein a handler for the page fault transfers data from the first computer to the second computer.

5. The computer-implemented method of claim 1, wherein an attempt by the first software component to access certain data updated by the second software component generates a page fault.

6. The computer-implemented method of claim 5, wherein a handler for the page fault transfers data from the second computer to the first computer.

7. The computer-implemented method of claim 1, embodied in a cloud-computing environment.

8. A computer program product for distributed data processing for a software application that includes no code that targets a distributed data processing system, the computer program product comprising a computer-readable storage medium having program instructions embodied therewith, the program instructions executable by a computer to cause the computer to perform:
    in a first process executing a first software component on a first computer, establishing a reference to at least a second software component resident on a second computer;
    establishing a handler in a second process executing on the second computer;
    determining that the first process is attempting to invoke a routine of the second software component based on the handler;
    transferring data from the first process to the second process;
    arranging for the first process to await a response from the second process;
    invoking, by the second process, the routine of the second software component; and
    providing, by the second process, the response to the first process.

9. The computer program product of claim 8, wherein the transferring data from the first process to the second process comprises transferring parameters that are passed between the first software component and the second software component as part of a call to a routine.

10. The computer program product of claim 8, wherein an attempt by the second software component to access certain data established by the first software component generates a page fault.

11. The computer program product of claim 10, wherein a handler for the page fault transfers data from the first computer to the second computer.

12. The computer program product of claim 8, wherein an attempt by the first software component to access certain data updated by the second software component generates a page fault.

13. The computer program product of claim 12, wherein a handler for the page fault transfers data from the second computer to the first computer.

14. A distributed data processing system for a software application that includes no code that targets a distributed data processing system, said system comprising:
    a processor; and
    a memory, the memory storing instructions to cause the processor to perform:
        in a first process executing a first software component on a first computer, establishing a reference to at least a second software component resident on a second computer;
        establishing a handler in a second process executing on the second computer;
        determining that the first process is attempting to invoke a routine of the second software component based on the handler;
        transferring data from the first process to the second process;
        arranging for the first process to await a response from the second process;
        invoking, by the second process, the routine of the second software component; and
        providing, by the second process, the response to the first process.

15. The system of claim 14, wherein the transferring data from the first process to the second process comprises transferring parameters that are passed between the first software component and the second software component as part of a call to a routine.

16. The system of claim 14, wherein an attempt by the second software component to access certain data established by the first software component generates a page fault.

17. The system of claim 16, wherein a handler for the page fault transfers data from the first computer to the second computer.

18. The system of claim 14, wherein an attempt by the first software component to access certain data updated by the second software component generates a page fault.

19. The system of claim 18, wherein a handler for the page fault transfers data from the second computer to the first computer.

20. The system of claim 14, embodied in a cloud-computing environment.

* * * * *